United States Patent
Miller

(10) Patent No.: US 9,746,937 B2
(45) Date of Patent: Aug. 29, 2017

(54) METHOD AND APPARATUS FOR MOVABLE ASSEMBLY POSITION SENSING AND VIRTUAL KEYBOARD DISPLAY

(71) Applicant: BlackBerry Limited, Waterloo (CA)

(72) Inventor: Jon Stacey Miller, Cooper City, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 32 days.

(21) Appl. No.: 14/874,344

(22) Filed: Oct. 2, 2015

(65) Prior Publication Data

US 2017/0097689 A1    Apr. 6, 2017

(51) Int. Cl.
| | |
|---|---|
| *G06F 1/16* | (2006.01) |
| *G06F 3/02* | (2006.01) |
| *G06F 3/044* | (2006.01) |
| *G06F 3/0488* | (2013.01) |
| *G06T 13/80* | (2011.01) |
| *G06F 3/0485* | (2013.01) |

(52) U.S. Cl.
CPC ......... *G06F 3/0227* (2013.01); *G06F 1/1624* (2013.01); *G06F 1/1677* (2013.01); *G06F 3/044* (2013.01); *G06F 3/0485* (2013.01); *G06F 3/04886* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 2006/0287015 A1 | 12/2006 | Dunko | |
| 2010/0099463 A1* | 4/2010 | Kim | G06F 1/1624 455/566 |
| 2010/0328250 A1* | 12/2010 | Gorsica | G06F 1/1616 345/174 |
| 2013/0009858 A1 | 1/2013 | Lacey | |
| 2013/0127778 A1 | 5/2013 | Liu | |
| 2014/0225629 A1 | 8/2014 | Igari | |

FOREIGN PATENT DOCUMENTS

| | | |
|---|---|---|
| EP | 2046003 | 4/2009 |
| EP | 2228976 | 9/2010 |

OTHER PUBLICATIONS

Extended European Search Report Dated Feb. 21, 2017, for European Application No. 16187074.6.

* cited by examiner

*Primary Examiner* — Joseph Haley
(74) *Attorney, Agent, or Firm* — Thomas Grzesik; Fleit Gibbons Gutman Bongini & Bianco P.L.

(57) ABSTRACT

A method and computer program product are provided for operating a device having a housing section carrying a touch-sensitive display and a physical keyboard section movable in a sliding direction relative to the housing. A position detector determines a position of the physical keyboard section in relation to the housing section. A processor displays a graphical element on the touch-sensitive display when the position of the physical keyboard is closed and displays no graphical element when the position of the physical keyboard is open. The position detector is one or more of a magnetic sensor, a mechanical switch, or a touch controller coupled to a capacitive touch detection sensor matrix carried by the physical keyboard section. The graphical element may be a virtual keyboard. The virtual (Continued)

keyboard is displayed as a scrolling animation correlated to the position of the physical keyboard section.

22 Claims, 10 Drawing Sheets

METHOD AND APPARATUS FOR MOVABLE ASSEMBLY POSITION SENSING AND VIRTUAL KEYBOARD DISPLAY

BACKGROUND

Field of the Invention

The present invention relates to device keyboard interfaces and more particularly to a movable assembly comprising a physical keyboard for use in a device and a method of detecting a position of the movable assembly and displaying a virtual keyboard based on the position.

Description of the Related Art

Small electronic devices, such as handheld wireless communication devices, may be constructed such that one or more assemblies may move in relation to one another. For example, in the context of wireless communication devices, certain form factors commonly known as "sliders" include a sliding physical keyboard which may be closed to hide the physical keyboard when the device is not currently in interactive use by a user. Detection of the position of the physical keypad may be used as a trigger for various functions such as wake the device, lock screen rotation, etc.

Position detection may be achieved using additional electro-mechanical components, such as switches and magnets, which add additional cost to the device and consume valuable space within the limited constraints of the device. Additionally, these components may only detect an open or closed position and cannot define intermediate positions. In physical assemblies consisting of one or more moving pieces, there may be a need to detect and encode movement of individual pieces with greater granularity.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION

An aspect of the present disclosure provides for a device, computer program product and method of operating the device. The device includes a housing section, a physical keyboard section, a position detector and a processor. The housing section carries a touch-sensitive display. The physical keyboard section is coupled to the housing section such that the physical keyboard is movable in a sliding direction relative to the housing section. The position detector determines a position of the physical keyboard section in relation to the housing section. The processor displays a graphical element on the touch-sensitive display when the position of the physical keyboard is closed and displays no graphical element when the position of the physical keyboard is open. In one aspect, the graphical element may be a virtual keyboard.

In accordance with an aspect of the present disclosure, the position detector may be a magnetic sensor or a mechanical switch.

In accordance with another aspect of the present disclosure, the processor displays the virtual keyboard on the touch-sensitive display as an animation displayed in a scrolling fashion correlated to the position of the physical keyboard section.

In accordance with yet another aspect of the present disclosure, wherein the virtual keyboard comprises an upper boundary and a lower boundary, the virtual keyboard is removed from display in a lower boundary to an upper boundary manner when the physical keyboard is moved from an open position to a closed position. Likewise, the virtual keyboard is displayed in an upper boundary to a lower boundary manner when the physical keyboard is moved from a closed position to an open position.

In accordance with one aspect of the present disclosure, wherein the physical keyboard section further comprises a capacitive touch detection sensor matrix, the position detector is a touch controller coupled to the capacitive touch detection sensor matrix. The touch controller may detect movement of the physical keyboard section by determining a baseline measurement by scanning the capacitive touch detection sensor matrix to measure coupled charge on a row-by-row basis, determining a current measurement by rescanning the capacitive touch detection sensor matrix to measure coupled charge on a row-by-row basis, comparing the current measurement the baseline measurement to determine a difference in coupled charge of at least one row, and determining a speed and direction of movement according to the difference in coupled charge.

In accordance with yet another aspect of the present disclosure, the virtual keyboard is not displayed when the physical keyboard is in the closed position when the touch-sensitive display has detected no touches after expiration of a predetermined period of time.

Figure 1:
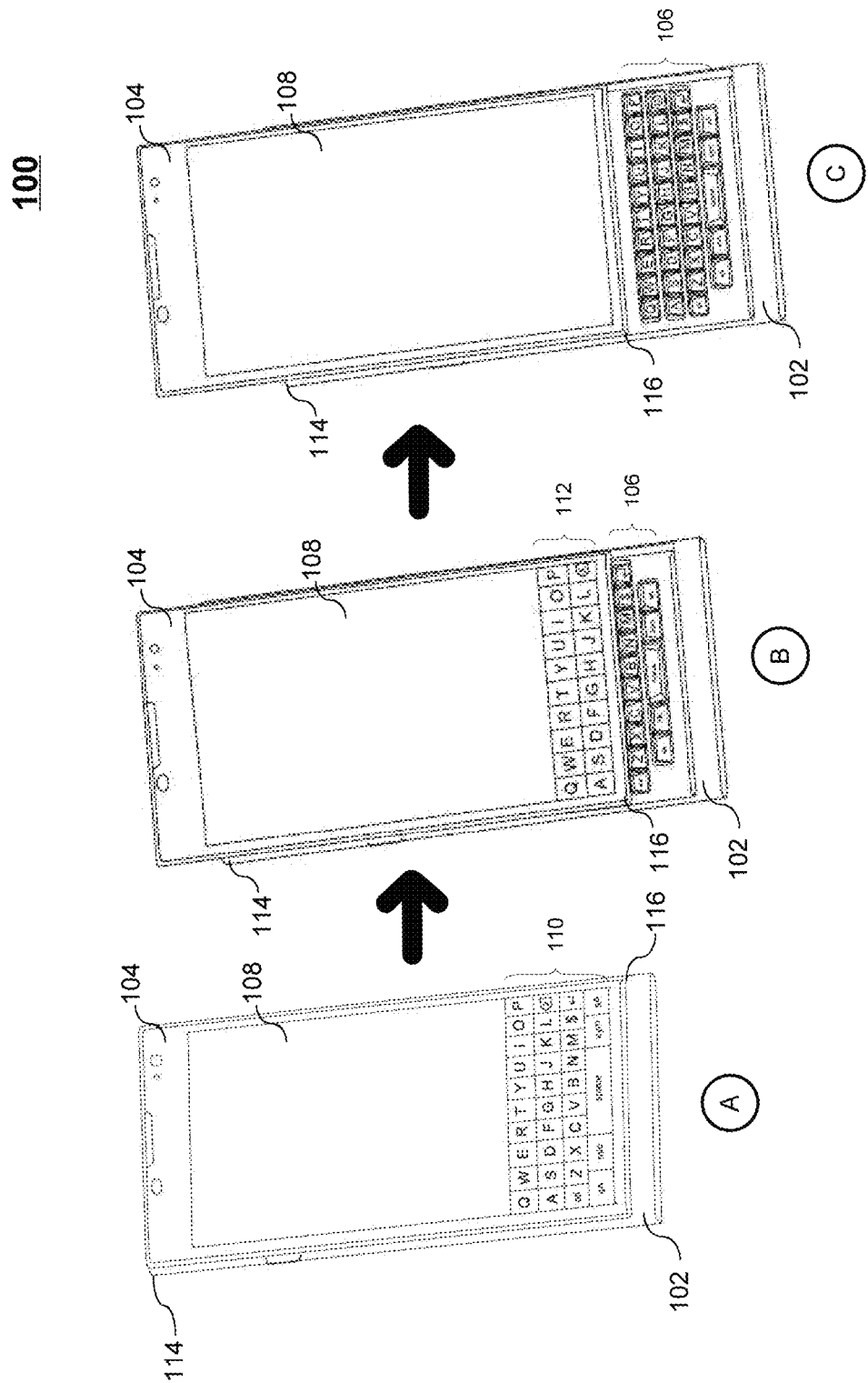
FIG. 1 is a pictorial illustration of an example process for detecting a position of a physical keyboard assembly in a device and correlating display of a virtual keyboard with the position of the physical keyboard in accordance with an aspect of the present disclosure.

Referring now to FIG. 1, an illustration is provided showing an example procedure on a device 100 for opening a physical keyboard section 102 of the device 100 using a slider mechanism. The device 100 may be a wireless communication device such as a cellular telephone, smart phone, personal data assistant (PDA), and the like. The slider mechanism allows the physical keyboard section 102 to be coupled to a main housing section 104 such that the physical keyboard section 102 moves in a sliding direction in relation to the main housing section 104 to reveal a physical keyboard 106. The main housing section 104 carries a touch-sensitive display 108 which may display a graphical element in correlation with the position of the physical keyboard section 102. Thus, when the physical keyboard section 102 is closed, the graphical element may be displayed and when the physical keyboard section 102 is open, the graphical element may not be displayed, and vice versa. In one example, discussed in greater detail below, the graphical element is a virtual keyboard 110. In an alternate example, the main housing section may contain the physical keyboard and the slider mechanism may allow a display to move.

A position detector (not shown) detects the position of the physical keyboard section 102 in relation to the main housing section 104. The position detector may be a magnetic sensor or mechanical switch located, inter alia, along the bottom edge 114 of the main housing section 114 or the top edge 116 of the physical keyboard section 102. Additionally, the position detector may be implemented as a capacitive touch detection sensor matrix (not shown) located underneath the physical keyboard 106 and coupled to a touch controller (not shown). Alternatively, the position detector may be implemented as a capacitive touch detection sensor matrix located underneath the display. A magnetic sensor or a mechanical switch serve to function merely as an on/off detector, showing only that the physical keyboard section 102 is opened or closed. However, the combination of capacitive touch detection sensor matrix and touch controller is much more sensitive and may be able to detect minute changes in position of the physical keyboard section 102 which is discussed in greater detail below. In other examples, the position detector may be implemented using various other sensors that are able to detect the position of the physical keyboard section 102, such as, but not limited to, one or more light sensors to detect the amount of light received at various locations along the physical keyboard section 102.

When the physical keyboard section 102 is in a closed position in relation to the main housing section 104 (i.e. position A and FIG. 2), the virtual keyboard 110 may be fully displayed, allowing a user to type directly on the touch-sensitive display 108. When the physical keyboard section 102 is in a fully open position in relation to the main housing section 104 where the physical keyboard section 102 cannot be opened further (i.e. position C and FIG. 4), the virtual keyboard 110 may not be displayed at all, allowing the user access to the physical keyboard 106 for text entry, thereby providing a larger viewing area on the touch-sensitive display 108 combined with a physical keyboard for user input, such user input may be more accurate in comparison to a virtual keyboard.

In one example, while the physical keyboard section 102 is in a partially open position (i.e. position B and FIG. 3) where certain upper keys on the physical keyboard 106 are covered by the main housing section 104, a partial virtual keyboard 112 is displayed on the touch-sensitive display 108 where the only keys displayed on the partial virtual keyboard 112 correlate to the keys on the physical keyboard 106 covered by the main housing section 104. As the physical keyboard section 102 is opened further, additional keys disappear in the partial virtual keyboard 112 as a scrolling animation which correlates the appearance of the partial virtual keyboard 112 with the movement direction and speed of the physical keyboard section 102. Depending upon the sensitivity of the position detector, the keys of the partial virtual keyboard 112 may disappear according to a set height, such as a row of full-height keys, a row of one pixel height, or as partial rows of keys containing a certain number of pixel rows. In one example, the speed that the animation appears to scroll correlates to the speed at which the physical keyboard section 102 is opened or closed.

Figure 2:
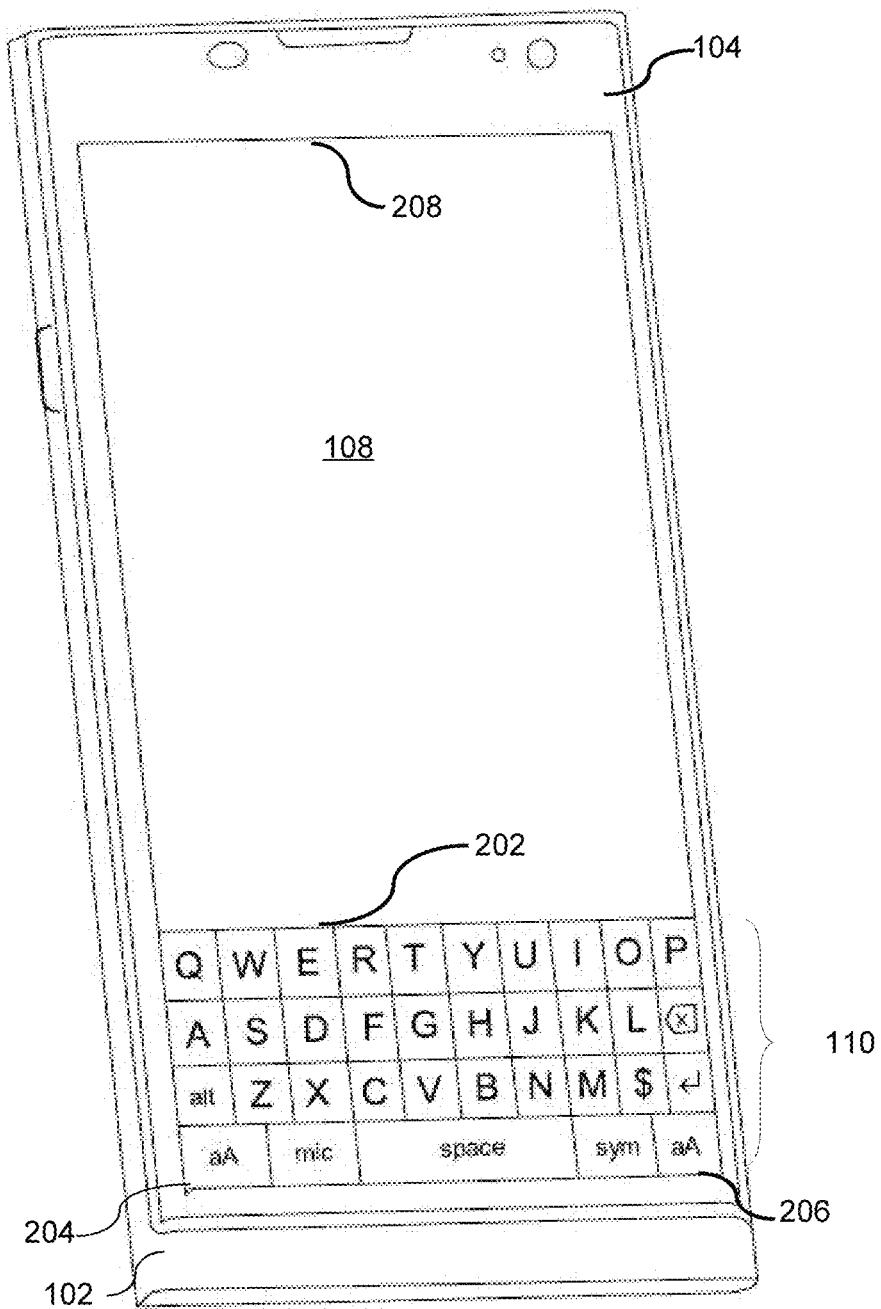
FIG. 2 is a perspective view of an example device having a physical keyboard in a closed position and fully displaying a virtual keyboard in accordance with an aspect of the present disclosure.

Referring now to FIG. 2, a perspective view of an example device 100 having a physical keyboard section 102 in a closed position and fully displaying a virtual keyboard 110 is shown. In the closed position, the main housing section 104 overlaps the physical keyboard section 102 and completely hides the physical keyboard. While in the closed position, a full virtual keyboard 110 is displayed. The full virtual keyboard 110 has an upper boundary 202 and a lower boundary 204. In the example shown in FIG. 2, the virtual keyboard 110 is positioned such that the lower boundary 204 of the virtual keyboard 110 is aligned along a bottom edge 206 of the touch-sensitive display 108. In other examples, the virtual keyboard 110 may be positioned at other areas of the display 108 (e.g., in a divided screen, the upper boundary 202 aligned with an upper edge 208 of the display 108, etc.).

As most users store the device 100 in a closed position when not in interactive use, in one example, the processor (not shown) may turn off the touch-sensitive display 108 or place the device 100 in a low current usage state when a touch controller (not shown) for the touch-sensitive display 108 has not detected any touches on the display 108 for a predetermined period of time (i.e. a "time-out" period). In this case, the virtual keyboard 110 is not displayed during the time-out period until the processor detects a wake-up event (e.g., a touch on the touch-sensitive display 108, an incoming call, opening of the physical keyboard section 102, etc.). If the device 100 remains in the closed position upon wake-up, the full virtual keyboard 110 is displayed again.

Figure 3:
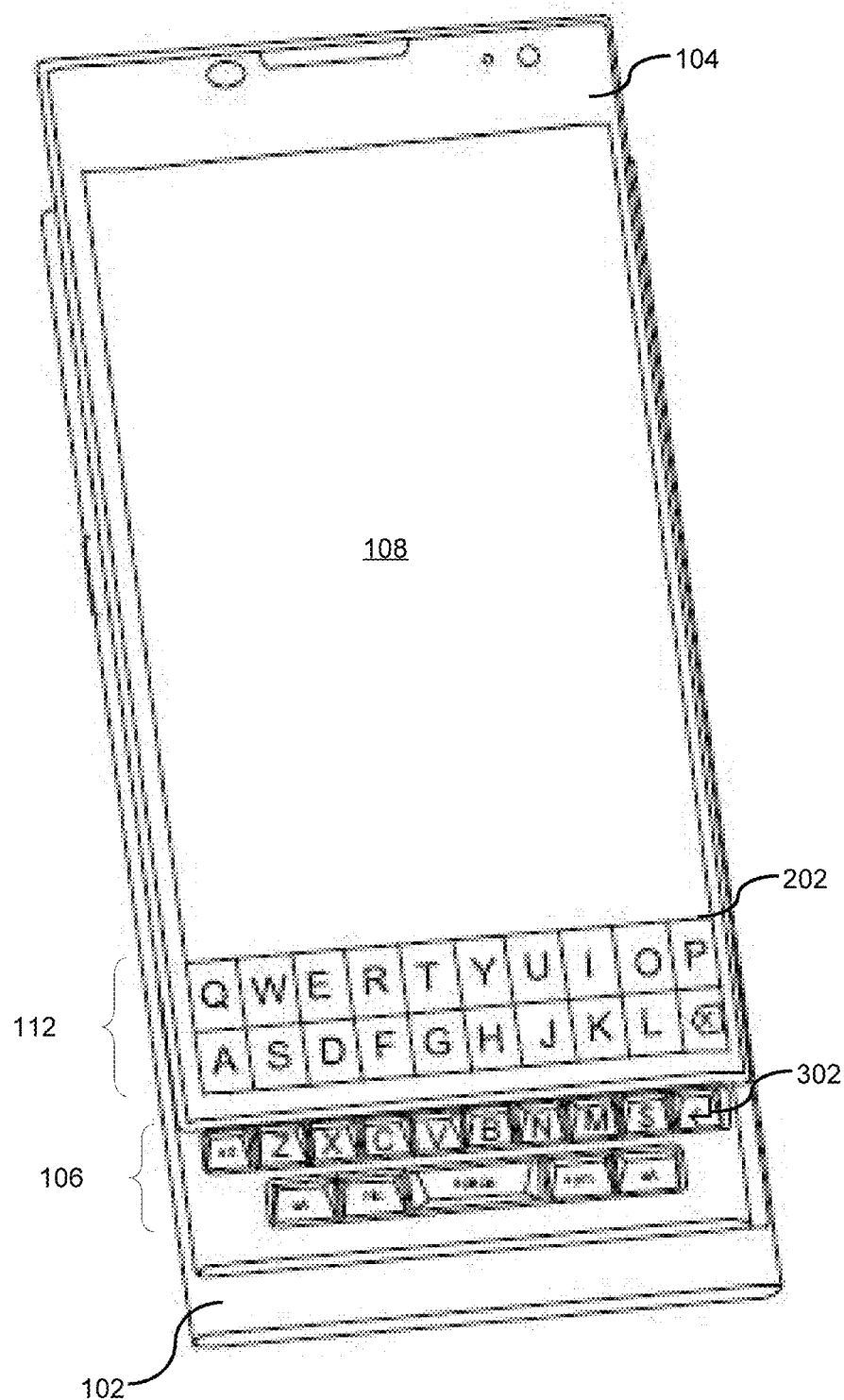
FIG. 3 is a perspective view of an example device having a physical keyboard in a partially open position and partially displaying a virtual keyboard in accordance with an aspect of the present disclosure.

FIG. 3 shows a perspective view of an example device 100 having a physical keyboard section 102 in a partially open position and displaying a partial virtual keyboard 112 in accordance with an aspect of the present disclosure. In this example, the main housing section 104 partially overlaps the physical keyboard section 102, preventing access to the upper rows of physical keys 302 on the physical keyboard 106. With a partially opened physical keyboard section 102, the user may enter text by touching upper row keys displayed in the partial virtual keyboard 112 on the touch-sensitive display 108 or by pressing actual physical keys 302 of the exposed lower row keys of the physical keyboard 106.

As the physical keyboard section 102 is opened further, additional physical keys are exposed and the virtual keyboard 112 is animated to disappear in correlation with the opening of the physical keyboard section 102. Likewise, as the physical keyboard section 102 is being closed, the virtual keyboard 112 is animated to appear in correlation with the opening of the physical keyboard section 102. In one example, the virtual keyboard 112 is animated to disappear by removing rows of keys or pixels from display beginning at the lower boundary 204 of the full virtual keyboard 100 and progressing through to the upper boundary 208 when the physical keyboard section 102 is moved from an open position to a closed position. Likewise, the virtual keyboard 110 is animated to appear by adding rows of keys or pixels from display in an upper boundary 208 to lower boundary 204 manner when the physical keyboard section 102 is moved from a closed position to an open position.

Figure 4:
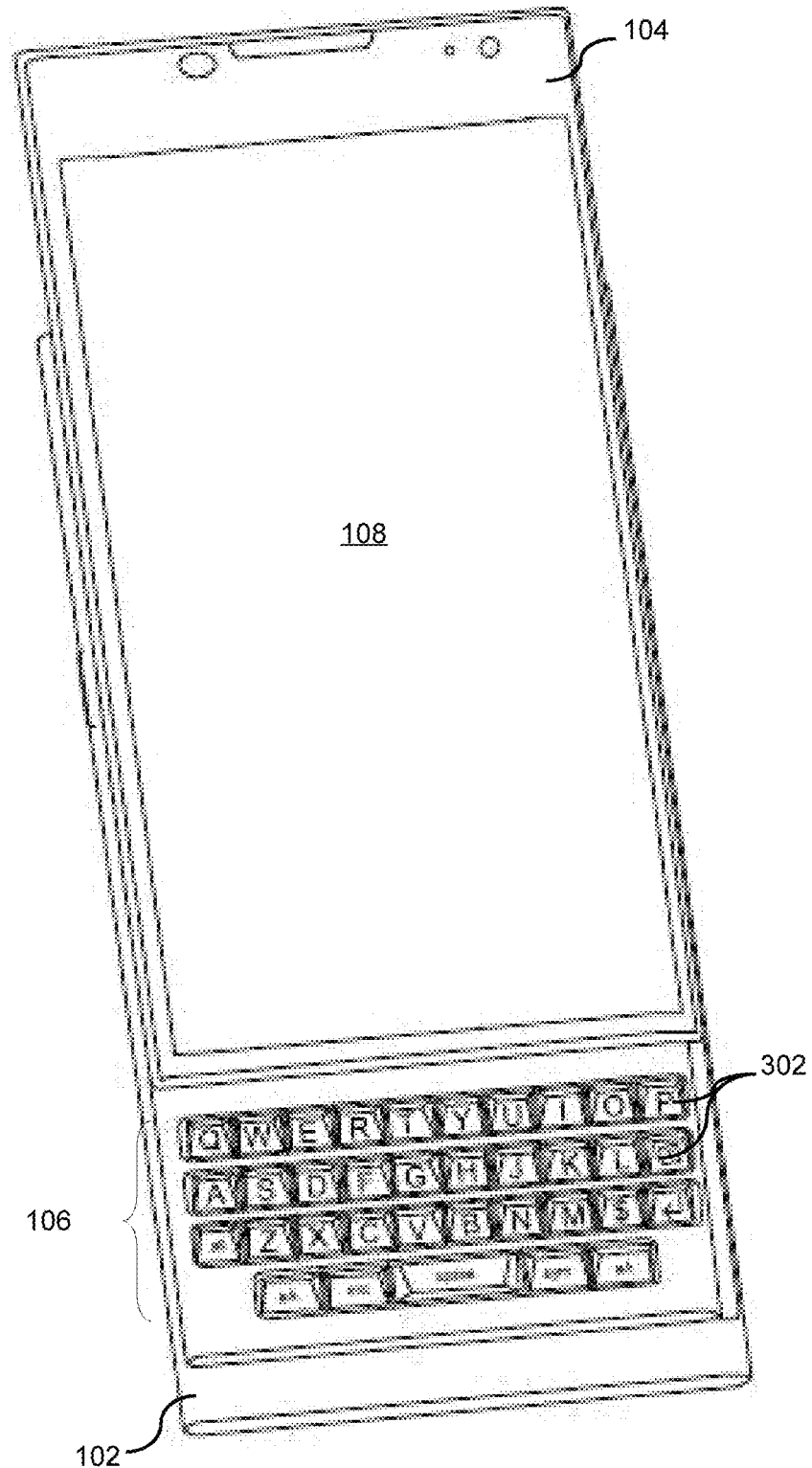
FIG. 4 is a perspective view of an example device having a physical keyboard in an open position and not displaying a virtual keyboard in accordance with an aspect of the present disclosure.

FIG. 4 is a perspective view of an example device 100 with the physical keyboard section 102 in a fully open position and not displaying a virtual keyboard in accordance with an aspect of the present disclosure. When the physical keyboard section 102 is opened to the furthest extent permitted (i.e. the physical keyboard section 102 is prevented from further movement), all the physical keys 302 of the physical keyboard 106 are fully exposed and usable, thereby eliminating the need to display a virtual keyboard 110 on the touch-sensitive display 108. However, there may be instances, depending upon the context being displayed on the screen (e.g., a game, custom application, etc.) where it is desirable to display an alternate virtual keyboard comprising symbols not available on the physical keyboard 106. Such alternative virtual keyboards are not prohibited by implementation of the present disclosure.

Figure 5:
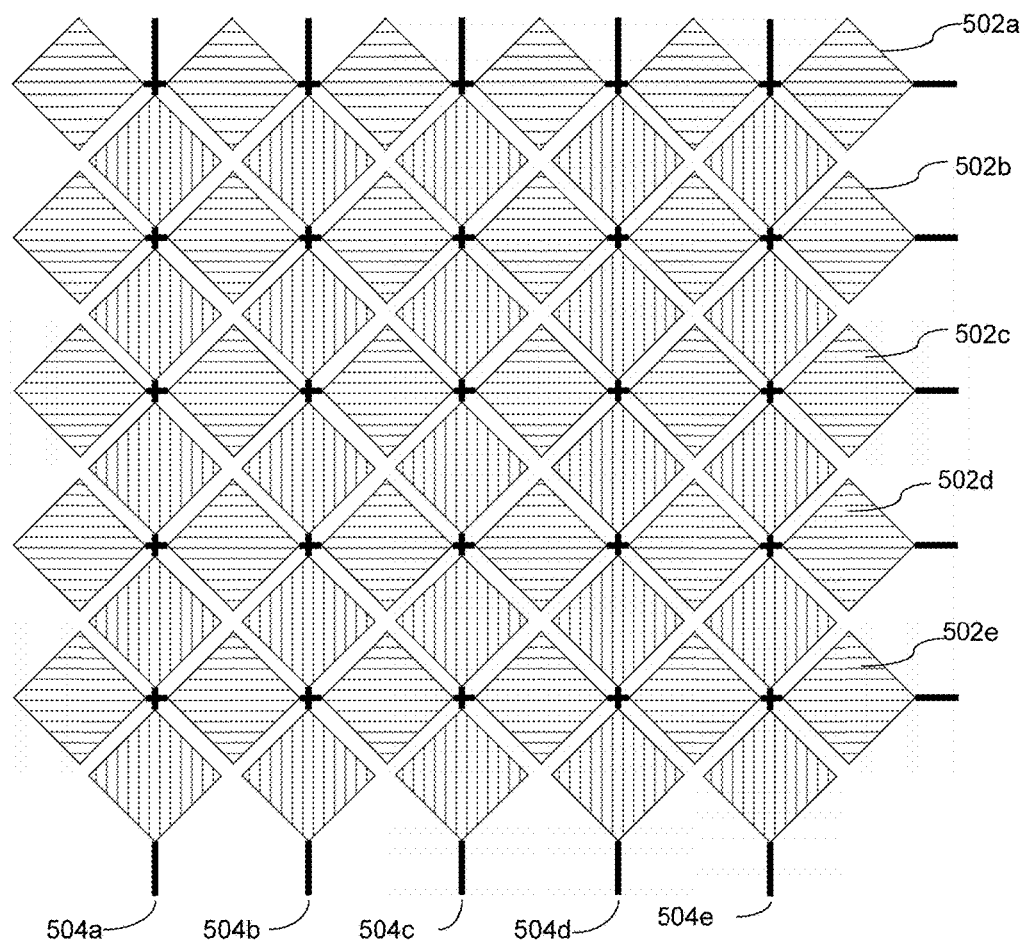
FIG. 5 is an example a capacitive touch detection sensor matrix used in conjunction with a physical keyboard to create a physical capacitive touch keyboard in accordance with an aspect of the present disclosure.

Referring now to FIG. 5, an example capacitive touch detection sensor matrix 500 is shown. A capacitive touch sensor may be implemented using a film with conductive areas arranged in a pattern to create an X-Y matrix of isolated regions as shown in FIG. 5. In this example matrix, 5 rows 502a, 502b, 502c, 502d, 502e (referenced collectively as row 502) and 5 columns 504a, 504b, 504c, 504d, 504e (referenced collectively as 504) are shown for illustrative purposes only. One skilled in the art would know that significantly more rows 502 and columns 504 of sensor may be used to implement a capacitive touch detection sensor matrix 500. In one example, the capacitive touch detection sensor matrix 500 is located underneath the physical keyboard 106 and coupled to a touch controller (not shown) to create a physical capacitive touch keyboard to detect a "touch" upon the physical keys 302. In a typical system, each column 504 of the matrix 500 is excited in succession by the touch controller and electrical charge is coupled into nearby rows 502. The touch controller scans the capacitive touch detection sensor matrix 500 to measure the coupled charge row-by-row. During one complete scan of all columns 504 and rows 502, a baseline set of measurements is determined. Real systems include additional processing not included in this description but known to those skilled in the art. When one or more areas' current measurements change relative to the baseline, a "touch" is inferred by the touch controller.

Figure 6:
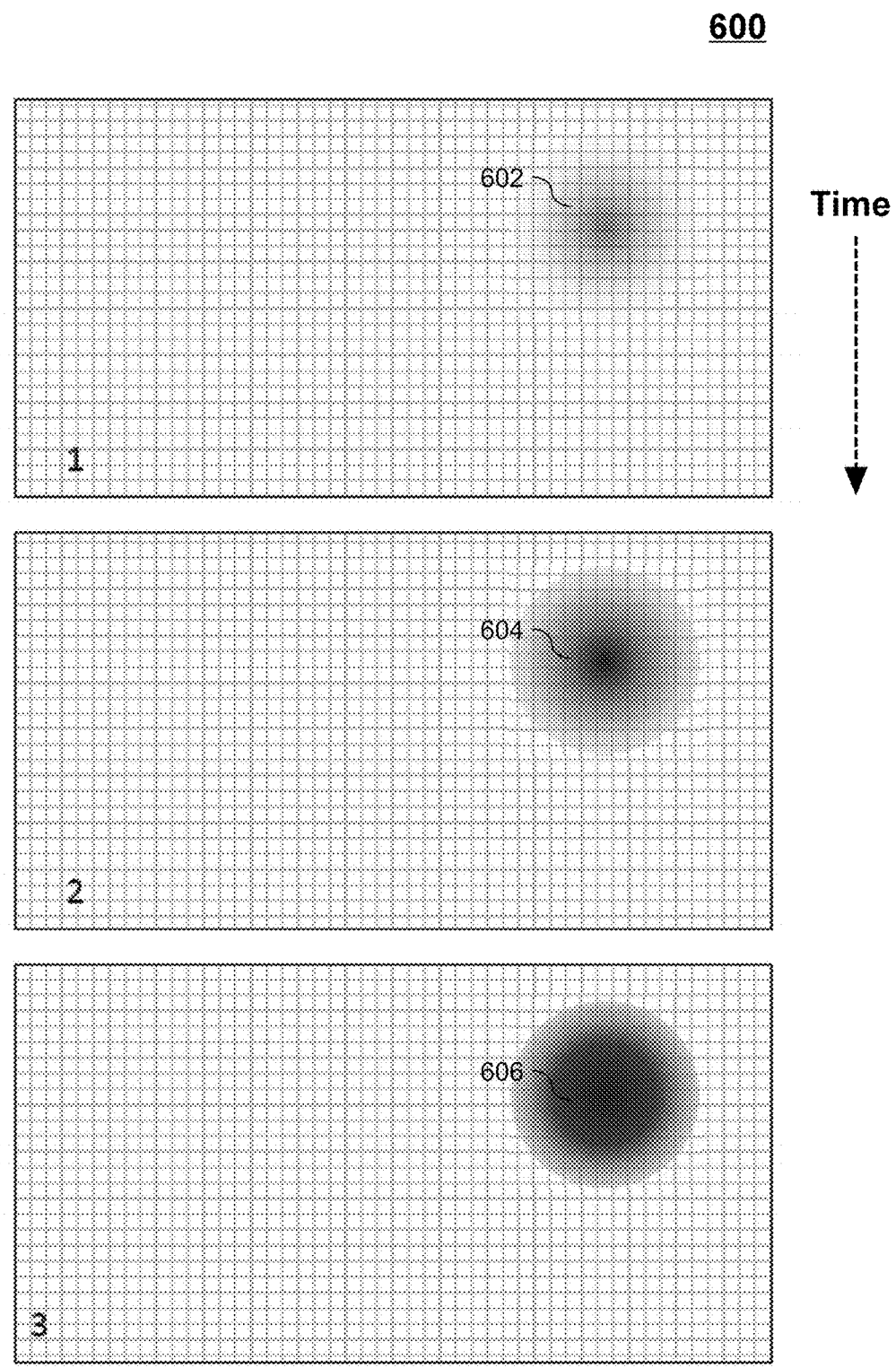
FIG. 6 is a time-lapsed illustration of detecting a single touch on a physical capacitive touch keyboard.

FIG. 6 is a time-lapsed illustration of detecting a single touch on a capacitive touch detection sensor matrix 500. Graph 600 represents the layout of capacitive touch detection sensor matrix 500 and shows the detected coupled charge over three instances of time. At time 1, the touch controller is beginning to detect an area 602 of changed charge detection, indicated here as a light grey circular area with higher change of charge intensity at the center of the circle and diminishing towards the edges. In graph 600, the intensity of the coupled charge is shown as increasing as the grey tones become darker. At time 2, the area 604 of increased change of charge has increased in size and intensity, and at time 3, a very distinct area 606 of high intensity change of charge is detected. This pattern of coupled charge is recognizable to the touch controller as a single touch occurring at position 606.

Figure 7:
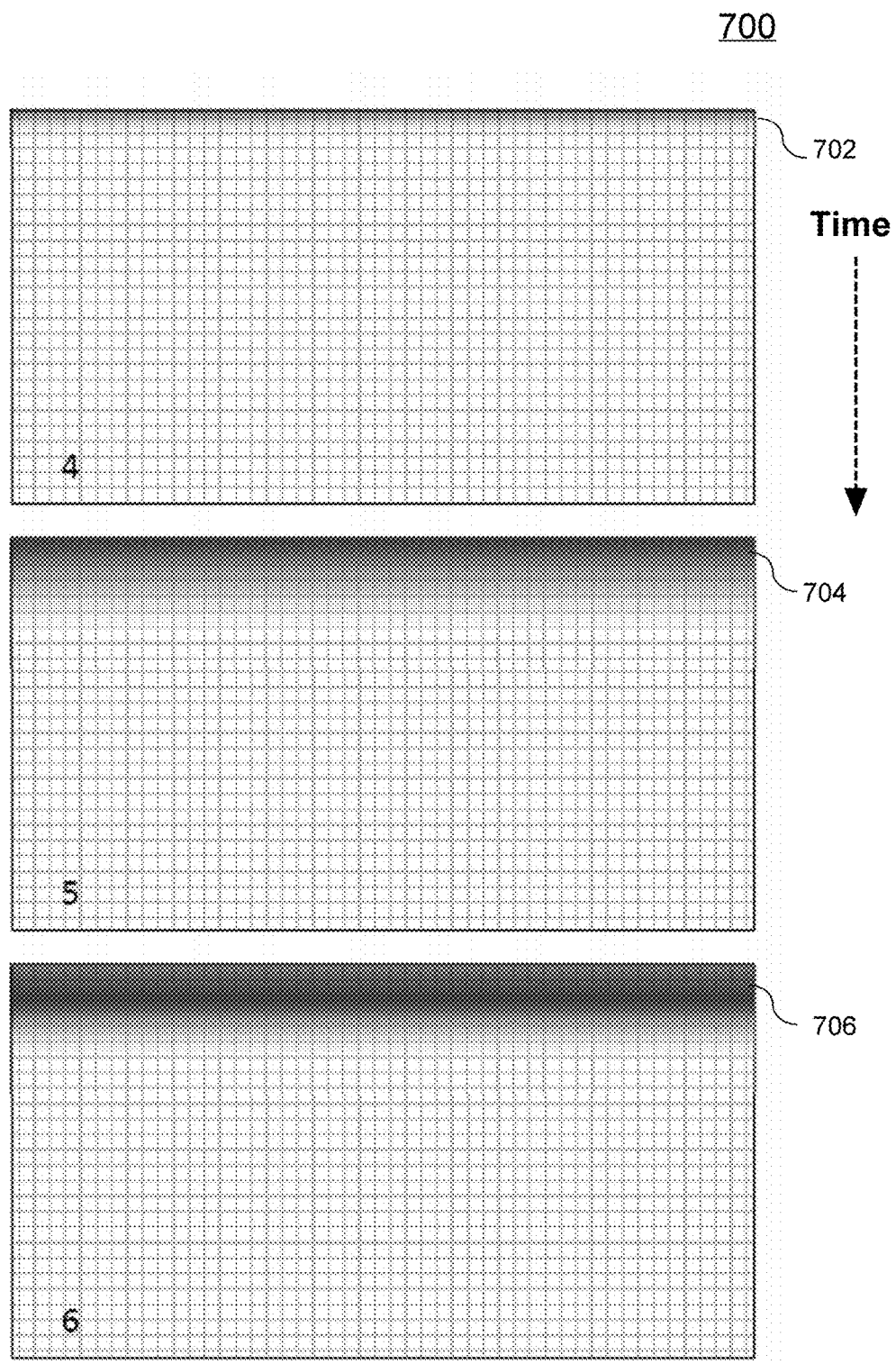
FIG. 7 is a time-lapsed illustration of detecting closing of an overlapping sliding housing section of a device using a physical capacitive touch keyboard in accordance with an aspect of the present disclosure.

In contrast, FIG. 7 is a time-lapsed illustration of detecting closing of an overlapping main housing section 104 of a device 100 using a physical capacitive touch keyboard in accordance with an aspect of the present disclosure. Graph 700 represents the layout of capacitive touch detection sensor matrix 500 and shows the detected coupled charge over three instances of time. At time 4, as the cover of the main housing section 104 is beginning to cover the physical capacitive touch keyboard, the touch controller is beginning to detect an area 702 of increased change of charge indicated here as a light grey area of one or more rows having higher change of charge intensity at the top of the capacitive touch detection sensor matrix 500 and diminishing as the rows are lower. In graph 700, as in graph 600, the intensity of the coupled charge is shown as increasing as the grey tones become darker. At time 5, the area 704 of increased charge has increased in size and intensity, and at time 6, a very distinct area 606 containing multiple rows of high intensity charge is detected. As the increased charge area is along an increasing series of rows, this pattern of coupled charge is recognizable to the touch controller as closing the physical capacitive touch keyboard in relation to the main housing unit 104. Because the capacitive touch detection sensor matrix 500 detects increased charge on a row-by-row basis, the processor can correlate the display of the virtual keyboard 110 in relation to the position and speed of the physical keyboard section 106 in a precise manner.

In other instances, for example, when the position detector is a magnetic sensor or a mechanical switch, although the exact positioning of the physical keyboard section 102 may not be known, the processor may still display the virtual keyboard in an animated fashion where the virtual keyboard appears in a scrolling manner with the uppermost rows of keys or pixels appearing first. In such case, the animation may be set to a completely display the full virtual keyboard 110 in a predetermined amount of time.

Figure 8:
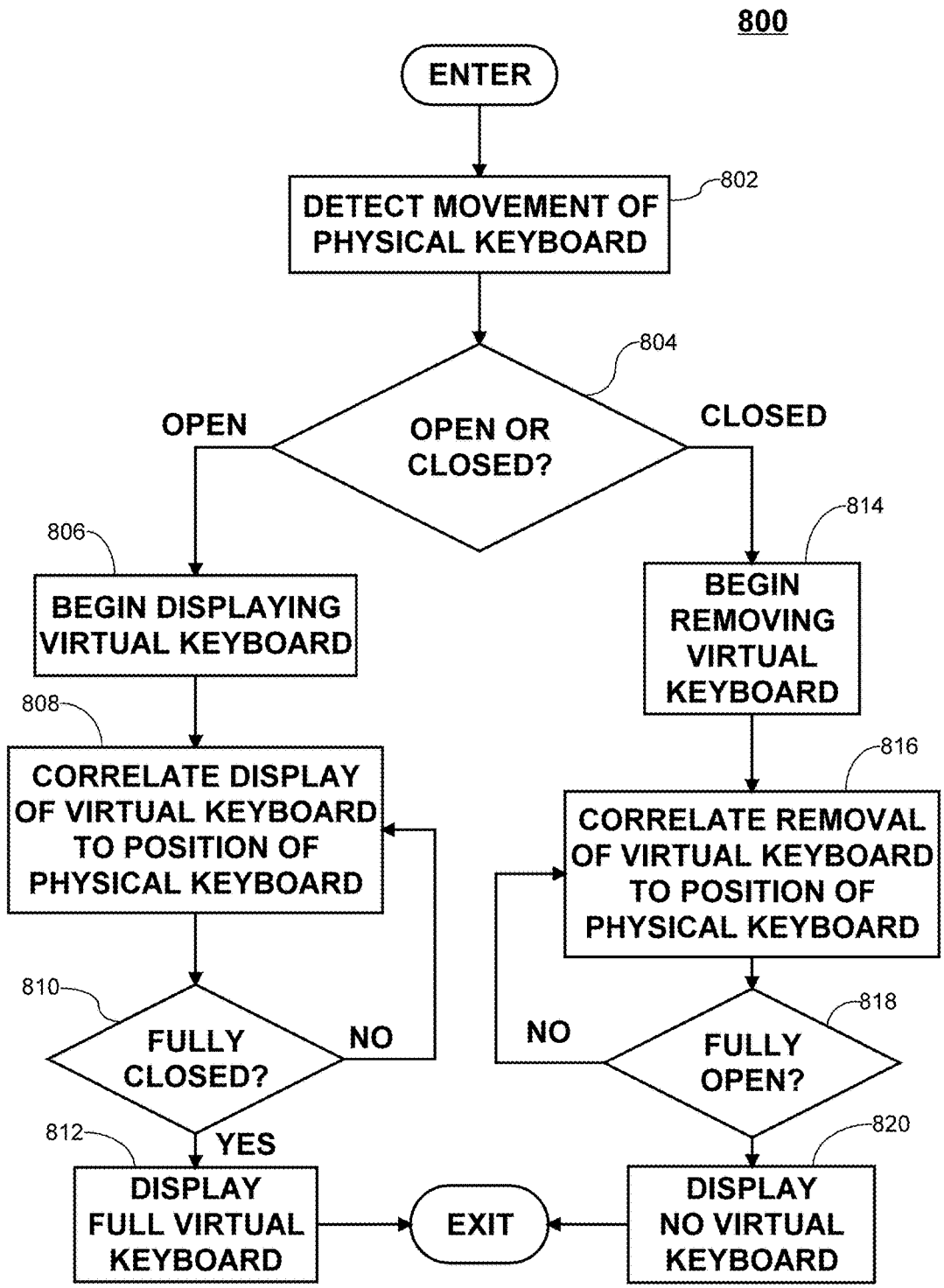
FIG. 8 is a flowchart illustrating an example process for detecting a change of position of a physical keyboard on a device and displaying a virtual keyboard in correlation with the position of the physical keyboard in accordance with an aspect of the present disclosure.

Referring now to FIG. 8, a flowchart illustrating an example process for detecting a change of position of a physical keyboard on a device and displaying a virtual keyboard in correlation with the position of the physical keyboard. Beginning at step 802, the position detector detects movement of the physical keyboard section 102 in relation to the main housing unit 104. If the physical keyboard section 102 is open, at step 804, the processor begins displaying, at step 806, a partial virtual keyboard 112 on the touch-sensitive display 108 and correlates, at step 808, the appearance of the partial virtual keyboard 112 with the position of the physical keyboard section 102. For example, when the position detector is a capacitive touch detection sensor matrix 500, the processor can easily correlate display of rows of the partial virtual keyboard 112 with a current position of the physical keyboard section 102.

As long as the physical keyboard section 102 is not fully closed, at step 810, the processor will continue to correlate the display of the partial virtual keyboard 112 on the touch-sensitive display 108. When the physical keyboard section 102 is fully closed, at step 810, the processor will display the full virtual keyboard 110 on the touch-sensitive display 108. Optionally, if a predetermined period of time lapses with detecting a touch on the touch-sensitive display, the processor may cause the device 100 to enter a reduced power consumption mode and cease displaying the virtual keyboard.

Returning to decision block 804, if the physical keyboard section 102 is fully open, the processor begins removing, at step 814 the virtual keyboard 110 from the touch-sensitive display 108. The processor continues to correlate, at step 816, the removal of the virtual keyboard to the position of the physical keyboard section 102 as long as the physical keyboard section 102 is not in the fully open position. It should be noted that as the correlation is based on the current position of the physical keyboard section 102, it follows that the virtual display should be removed at the same speed in which the physical keyboard section 106 is moving. When the physical keyboard section 102 is fully open, at step 818, the virtual keyboard is no longer displayed, at step 820, on the touch-sensitive display 108.

Figure 9:
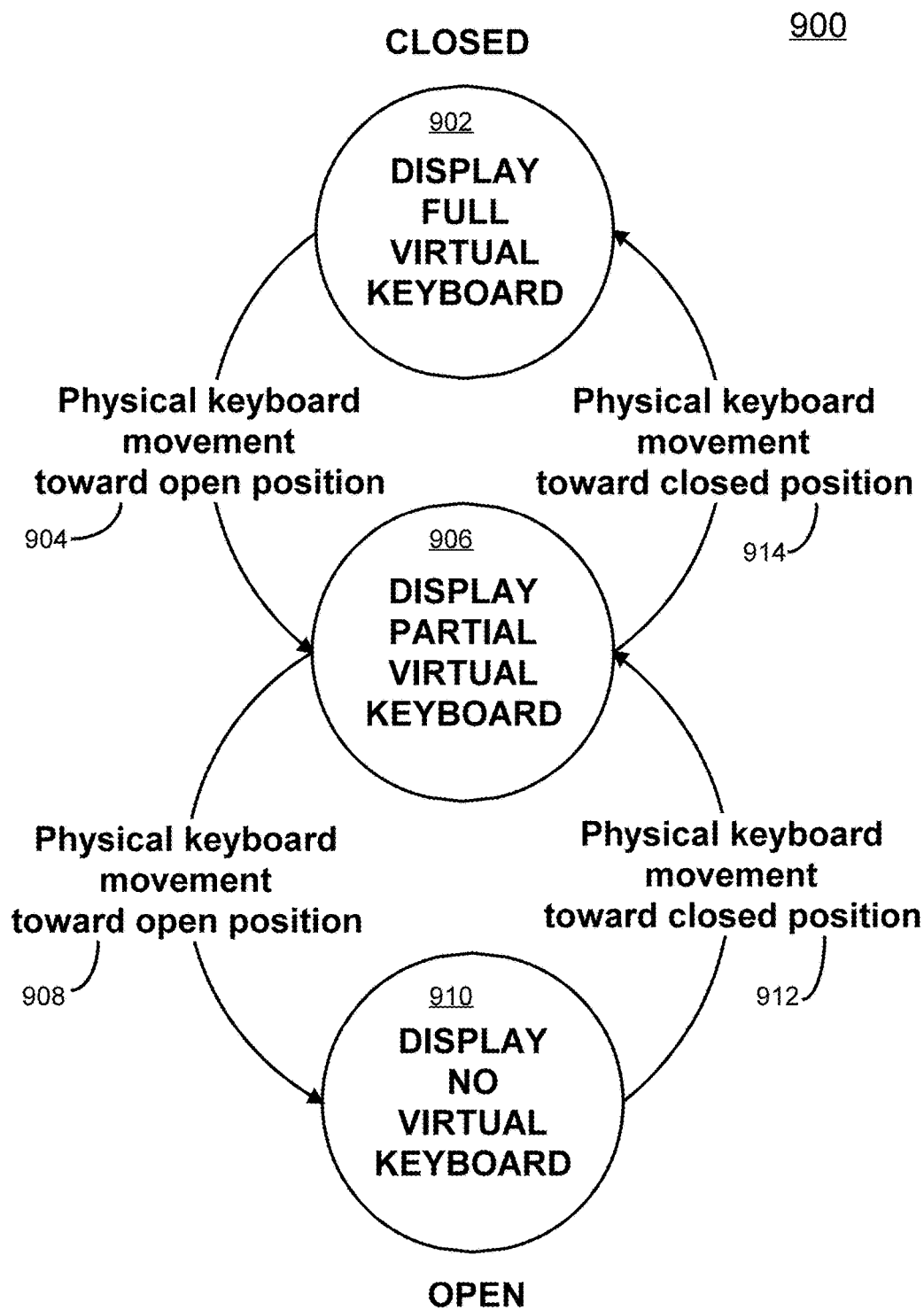
FIG. 9 is a state diagram reflecting changes in display of a virtual keyboard on a device in correlation with a position of a physical keyboard in accordance with an aspect of the present disclosure.

FIG. 9 further provides a state diagram reflecting changes in display of a virtual keyboard on a device in correlation with a position of a physical keyboard. Beginning at state 902, when the physical keyboard section 102 is in a closed position, a full virtual keyboard is displayed. Upon detection 904 of movement of the physical keyboard section 102 toward a fully open position, the processor begins displaying, at state 906, a partial virtual keyboard in correlation with the opening. From state 906, when the physical keyboard section 102 is moved 908 to a fully open position, at state 910, no virtual keyboard is displayed. From state 910, when movement toward a closed position is detected 912, the processor begins removing the virtual keyboard from display, at state 906. From state 906, when the physical keyboard section 106 is moved 914 to a fully closed position, at state 902, a full virtual keyboard is displayed on the touch-sensitive display. It should be noted that the animated virtual keyboard may not be completely engaged or disengaged if the physical keyboard section 102 does not reach a fully open or closed position. In other words, if the user is moving the physical keyboard section 102 back and forth, the animated virtual keyboard will scroll along with the physical keyboard section 102 in the direction and speed of movement.

In an alternative embodiment, the processor may or may not display the virtual keyboard according to the context currently displayed on the touch-sensitive display 108. For example, if the homescreen is displayed, the virtual keyboard may not be displayed as a keyboard is typically not needed to navigate the homescreen. The device 100 may refrain from displaying the virtual keyboard in cases where the content shown on the display does not require interactive input (e.g., during media playback, etc.). In other instances, an alternate virtual keyboard may be displayed comprising symbols not found on the physical keyboard 106 and relating to the context currently displayed, potentially including alternate key definitions to provide simplified navigation within the homescreen touch-sensitive icons or notifications for selection from the keyboard.

Figure 10:
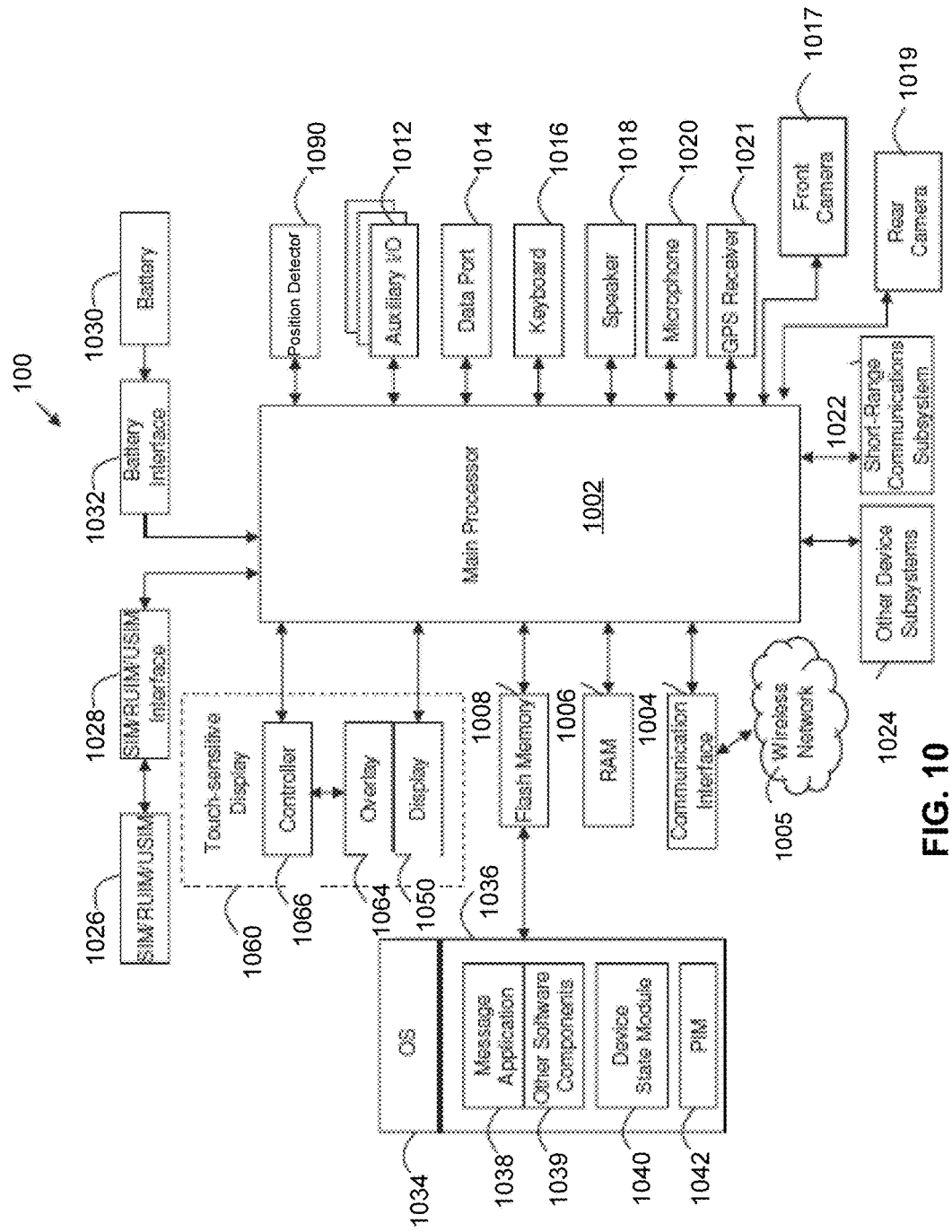
FIG. 10 is a block diagram of an example device in accordance with an aspect of the present disclosure.

Referring to FIG. 10, to further aid in the understanding of the example devices 100 described above, shown therein is a block diagram of an example configuration of a communication device configured as a "wireless communication device," referred to generally as "wireless communication device 100." The wireless communication device 100 includes a number of components such as a main processor 1002 that controls the overall operation of the mobile device 10. Communication functions, including data and voice communications, are performed through at least one communication interface 1004. The communication interface 1004 receives messages from and sends messages to a wireless network 1005. In this example of the wireless communication device 100, the communication interface 1004 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 1004 with the wireless network 1005 represents one or more different Radio Frequency (RF) channels, operating according to defined protocols specified for GSM/GPRS communications.

The main processor 1002 also interacts with additional subsystems such as a Random Access Memory (RAM) 1006, a flash memory 1008, a touch-sensitive display 1060, an auxiliary input/output (I/O) subsystem 1012, a data port 1014, a keyboard 1016 (physical, virtual, or both), a speaker 1018, a microphone 1020, a GPS receiver 1021, a front camera 1017, a rear camera 1019, short-range communications subsystem 1022, and other device subsystems 1024. Some of the subsystems of the wireless communication device 100 perform communication-related functions, whereas other subsystems may provide "resident" or on-device functions. By way of example, the touch-sensitive display 1060 and the keyboard 1016 may be used for both communication-related functions, such as entering a text message for transmission over the wireless network 1005, and device-resident functions such as a calculator or task list.

The wireless communication device 100 can send and receive communication signals over the wireless network 1005 after required network registration or activation procedures have been completed. Network access is associated with a subscriber or user of the wireless communication device 100. To identify a subscriber, the wireless communication device 100 may use a subscriber module component or "smart card" 1026, such as a Subscriber Identity Module (SIM), a Removable User Identity Module (RUIM) and a Universal Subscriber Identity Module (USIM). In the example shown, a SIM/RUIM/USIM 1026 is to be inserted into a SIM/RUIM/USIM interface 1028 in order to communicate with a network.

The wireless communication device 100 is typically a battery-powered device and includes a battery interface 1032 for receiving one or more rechargeable batteries 1030. In at least some examples, the battery 1030 can be a smart battery with an embedded microprocessor. The battery interface 1032 is coupled to a regulator (not shown), which assists the battery 1030 in providing power to the wireless communication device 100. Although current technology makes use of a battery, future technologies such as micro fuel cells may provide the power to the wireless communication device 100.

The wireless communication device 100 also includes an operating system 1034 and software components 1036 to 1042. The operating system 1034 and the software components 1036 to 1042, that are executed by the main processor 1002 are typically stored in a non-transitory persistent store such as the flash memory 1008, which may alternatively be a read-only memory (ROM) or similar storage element (not shown). Those skilled in the art will appreciate that portions of the operating system 1034 and the software components 1036 to 1042, such as specific device applications, or parts thereof, may be temporarily loaded into a volatile store such as the RAM 1006. Other software components can also be included, as is well known to those skilled in the art.

The subset of software applications 1036 that control basic device operations, including data and voice communication applications, may be installed on the wireless communication device 100 during its manufacture. Software applications may include a message application 1038, a device state module 1040, and a Personal Information Manager (PIM) 1042. A message application 1038 can be any suitable software program that allows a user of the wireless communication device 100 to send and receive electronic messages, such as the email messaging application described herein, wherein messages are typically stored in the flash memory 1008 of the wireless communication device 100. A device state module 1040 provides persistence, i.e. the device state module 1040 ensures that important device data is stored in persistent memory, such as the flash memory 1008, so that the data is not lost when the mobile device 10 is turned off or loses power. A PIM 1042 includes functionality for organizing and managing data items of interest to the user, such as, but not limited to, e-mail, contacts, calendar events, and voice mails, and may interact with the wireless network 1005.

Other types of software applications or components 1039 can also be installed on the wireless communication device 100. These software applications 1039 can be pre-installed applications (i.e. other than message application 1038) or third party applications, which are added after the manufacture of the wireless communication device 100. Examples of third party applications include games, calculators, utilities, etc.

The additional applications 1039 can be loaded onto the wireless communication device 100 through at least one of the wireless network 1005, the auxiliary I/O subsystem 1012, the data port 1014, the short-range communications subsystem 1022, or any other suitable device subsystem 1024.

The data port 1014 can be any suitable port that enables data communication between the wireless communication device 100 and another computing device. The data port 1014 can be a serial or a parallel port. In some instances, the data port 1014 can be a Universal Serial Bus (USB) port that includes data lines for data transfer and a supply line that can provide a charging current to charge the battery 1030 of the wireless communication device 100.

For voice communications, received signals are output to the speaker 1018, and signals for transmission are generated by the microphone 1020. Although voice or audio signal output is accomplished primarily through the speaker 1018, the display 1050 can also be used to provide additional information such as the identity of a calling party, duration of a voice call, or other voice call related information.

The touch-sensitive display 1060 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 1060 is a capacitive touch-sensitive display which includes a capacitive touch-sensitive overlay 1064. The overlay 1064 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 1050 of the touch-sensitive display 1060 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 1060. The processor 1002 may determine attributes of the touch, including a location of a touch. Touch location data may include an area of contact or a single point of contact, such as a point at or near a center of the area of contact, known as the centroid. A signal is provided to the controller 1066 in response to detection of a touch. A touch may be detected from any suitable object, such as a finger, thumb, appendage, or other items, for example, a stylus, pen, or other pointer depending on the nature of the touch-sensitive display 1060. The location of the touch moves as the detected object moves during a touch. One or both of the controller 1066 and the processor 1002 may detect a touch by any suitable contact member on the touch-sensitive display 1060. Similarly, multiple simultaneous touches, are detected.

In some examples, a position detector 1090 is provided to detect the position of a physical keyboard 1060. The position detector 1090 may be a magnetic sensor, a mechanical switch, a touch controller coupled to a capacitive touch detection sensor matrix positioned underneath the physical keyboard 1060, or a combination thereof.

Aspects of the present disclosure may be embodied as a device or apparatus, system, method or computer program product. Accordingly, aspects of the present disclosure may take the form of an entirely hardware-based embodiment, an entirely software-based embodiment (including firmware, resident software, micro-code, etc.) or an embodiment combining software and hardware that may all generally be referred to herein as a "circuit," "module" or "system." Furthermore, aspects of the present disclosure may take the form of a computer program product embodied in one or more computer readable medium(s) having computer readable program code embodied thereon. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) may include the following tangible media: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Non-tangible or non-transitory media may include a propagated data signal with computer readable program code embodied therein, for example, in baseband or as part of a carrier wave. Such a propagated signal may take any of a variety of forms, including, but not limited to, electromagnetic, optical, or any suitable combination thereof. Computer program code or instructions for carrying out operations for aspects of the present disclosure may be any combination of one or more programming languages, including an object oriented programming language and conventional procedural programming languages. The program code may execute on one or more devices such as a computer and/or server.

Aspects of the present disclosure have been described above with reference to flowchart illustrations and/or block diagrams of methods, apparatus (systems) and computer program products according to embodiments of the disclosure. In this regard, the flowchart and block diagrams in the figures illustrate the architecture, functionality, and operation of possible implementations of systems, methods and computer program products according to various embodiments. However it should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented wholly or partially by special purpose hardware-based systems that perform the specified functions or acts, or combinations of special purpose hardware and computer instructions. Furthermore it also will be understood that each block of the flowchart illustrations and/or block diagrams, and combinations of blocks in the flowchart illustrations and/or block diagrams, can be implemented wholly or partially by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Finally, the terminology used herein is for the purpose of describing particular embodiments only and is not intended to be limiting. That is, the description of the present disclosure has been presented for purposes of illustration and description, but is not intended to be exhaustive or limited to the form disclosed. Many modifications and variations will be apparent without departing from the scope of the disclosure defined in the appended claims.

I claim:

1. A device comprising:
   a housing section comprising a touch-sensitive display;
   a physical keyboard section coupled to the housing section such that the physical keyboard section is movable in a sliding direction relative to the housing section, and wherein the physical keyboard section further comprises a capacitive touch detection sensor matrix;
   a position detector that determines a position of the physical keyboard section in relation to the housing section based on one or more portions of the capacitive touch detection sensor matrix comprising an electrical charge or being absent an electrical charge in response to the position of the physical keyboard section; and
   a processor that displays a graphical element on the touch-sensitive display when the position of the physical keyboard section is closed and displays no graphical element when the position of the physical keyboard section is open.

2. The device of claim 1, wherein the position detector is one or more of a magnetic sensor, a mechanical switch and a capacitive sensor.

3. The device of claim 1, wherein the graphical element is a virtual keyboard.

4. The device of claim 3, wherein the processor displays the virtual keyboard on the touch-sensitive display as an animation displayed in a scrolling fashion correlated with the position of the physical keyboard section.

5. The device of claim 4, wherein the virtual keyboard comprises an upper boundary and a lower boundary, the virtual keyboard is removed from display in a lower boundary to an upper boundary manner when the physical keyboard section is moved in relation to the housing section from an open position to a closed position, and the virtual keyboard is displayed in an upper boundary to a lower boundary manner when the physical keyboard section is moved in relation to the housing section from a closed position to an open position.

6. The device of claim 4, wherein the position detector is a touch controller coupled to the capacitive touch detection sensor matrix.

7. The device of claim 6, wherein the touch controller detects movement of the physical keyboard section by:
   determining a baseline measurement by scanning the capacitive touch detection sensor matrix to measure coupled charge on a row-by-row basis;
   determining a current measurement by rescanning the capacitive touch detection sensor matrix to measure coupled charge on a row-by-row basis;
   comparing the current measurement the baseline measurement to determine a difference in coupled charge of at least one row; and
   determining a speed and direction of movement according to the difference in coupled charge.

8. The device of claim 3, wherein the virtual keyboard is not displayed when the physical keyboard section is in the closed position when the touch-sensitive display has detected no touches after expiration of a predetermined period of time.

9. A method of operating a device having a housing section carrying a touch-sensitive display and a physical keyboard section movable in a sliding direction relative to the housing section, the method comprising:
   determining, by a position detector, a position of the physical keyboard section in relation to the housing section based on one or more portions of a capacitive touch detection sensor matrix within in the physical keyboard section comprising an electrical charge or being absent an electrical charge in response to the position of the physical keyboard section;
   displaying, by a processor, a graphical element on the touch-sensitive display when the position of the physical keyboard section is closed; and
   displaying, by a processor, no graphical element on the touch-sensitive display when the position of the physical keyboard section is open.

10. The method of claim 9, wherein the graphical element is a virtual keyboard.

11. The method of claim 10, wherein the processor displays the virtual keyboard on the touch-sensitive display as an animation displayed in a scrolling fashion correlated to the position of the physical keyboard section.

12. The method of claim 10, wherein the virtual keyboard comprises an upper boundary and a lower boundary, the virtual keyboard is removed from display in a lower boundary to an upper boundary manner when the physical keyboard section is moved in relation to the housing section from an open position to a closed position, and the virtual keyboard is displayed in an upper boundary to a lower boundary manner when the physical keyboard section is moved in relation to the housing section from a closed position to an open position.

13. The method of claim 10, wherein the position detector is a touch controller coupled to the capacitive touch detection sensor matrix.

14. The method of claim 13, wherein the touch controller detects movement of the physical keyboard section by:
determining a baseline measurement by scanning the capacitive touch detection sensor matrix to measure coupled charge on a row-by-row basis;
determining a current measurement by rescanning the capacitive touch detection sensor matrix to measure coupled charge on a row-by-row basis;
comparing the current measurement the baseline measurement to determine a difference in coupled charge of at least one row; and
determining a speed and direction of movement according to the difference in coupled charge.

15. The method of claim 9, further comprising not displaying the virtual keyboard when the physical keyboard section is in the closed position when the touch-screen display has detected no touches after expiration of a predetermined period of time.

16. A computer program product for operating a device having a housing section carrying a touch-sensitive display and a physical keyboard section movable in a sliding direction relative to the housing, the computer program product comprising:
a non-transitory computer readable storage medium having computer readable program code embodied therewith, the computer readable program code comprising: computer readable program code for:
determining, by a position detector, a position of the physical keyboard section in relation to the housing section, wherein the position detector is a touch controller and further comprising computer readable program code for detecting movement of the physical keyboard section by:
determining a baseline measurement by scanning a capacitive touch detection sensor matrix within the keyboard section to measure coupled charge on a row-by-row basis;
determining a current measurement by rescanning the capacitive touch detection sensor matrix to measure coupled charge on a row-by-row basis;
comparing the current measurement the baseline measurement to determine a difference in coupled charge of at least one row; and
determining a speed and direction of movement according to the difference in coupled charge;
displaying, by a processor, a graphical element on the touch-sensitive display when the position of the physical keyboard section is closed; and
displaying, by a processor, no graphical element on the touch-sensitive display when the position of the physical keyboard section is open.

17. The computer program product of claim 16, wherein the position detector is one or more of a magnetic sensor, a mechanical switch, a capacitive sensor and a touch controller coupled to the capacitive touch detection sensor matrix carried by the physical keyboard section.

18. The computer program product of claim 17, wherein the graphical element is a virtual keyboard.

19. The computer program product of claim 18, wherein the processor displays the virtual keyboard on the touch-sensitive display as an animation displayed in a scrolling fashion correlated to the position of the physical keyboard section.

20. The computer program product of claim 18, wherein the virtual keyboard comprises an upper boundary and a lower boundary, the virtual keyboard is displayed in an upper boundary to a lower boundary manner when the physical keyboard section is moved in relation to the housing section from a closed position to an open position and the virtual keyboard is removed from display in a lower boundary to an upper boundary manner when the physical keyboard section is moved in relation to the housing section from an open position to a closed position.

21. The computer program product of claim 18, further comprising computer readable program code for not displaying the virtual keyboard when the physical keyboard section is in the closed position when the touch-screen display has detected no touches after expiration of a predetermined period of time.

22. The method of claim 9, wherein the position detector further determines the position of the physical keyboard section in relation to the housing section based on one or more specific rows within the capacitive touch detection sensor matrix comprising an electrical charge or being absent an electrical charge in response to the position of the physical keyboard section in relation to the housing section.

\* \* \* \* \*